United States Patent Office 2,933,011
Patented Apr. 19, 1960

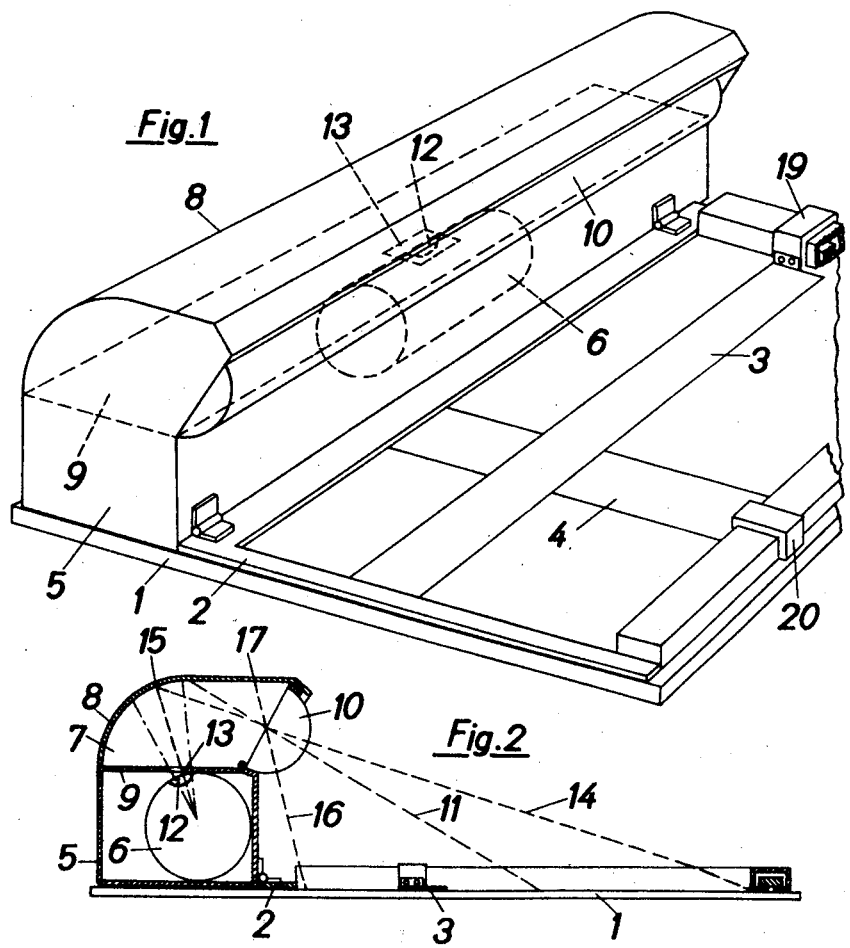
*Fig. 1*
*Fig. 2*
*Fig. 3*
RICHARD WICK &
FRIEDRICH BIEDERMANN
INVENTORS
BY
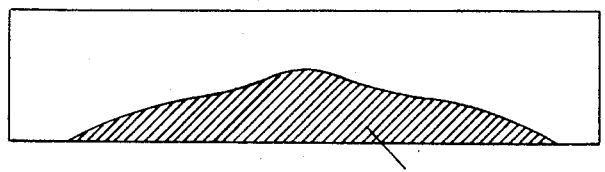
THEIR ATTORNEYS

2,933,011

EXPOSURE REGULATING DEVICE

Richard Wick, Munich, and Friedrich Biedermann, Munich-Unterhaching, Germany, assignors to AGFA Aktiengesellschaft, Leverkusen, Germany, a corporation of Germany Application June 10, 1955, Serial No. 514,463

Claims priority, application Germany June 18, 1954

12 Claims. (Cl. 88—24)

The present invention relates to an apparatus for regulating the exposure time during the optical copying of photographic pictures, and particularly relates to such a device wherein there is provide a photoelectric cell means that is activated by the rays of the copying light source as they are reflected from the copying paper.

Devices of this general type have heretofore been known. However, such previous devices had many defects, among one of which was the fact that the light rays reflected from the copying surface or printing layer are falling directly or after passing through a filter upon the photoelectric cell so that a relatively great distance between said cell and the copying surface is necessary. For this reason the arrangement of the photoelectric cell takes a relatively great amount of space above the enlarger frame. Therefore the regulating device is not generally employable.

Known apparatus of this type have the further disadvantage that the photoelectric cell is controlled by the light rays from a comparatively small part of the printing area (area of the projected light image) or, while being energized by light rays of the whole of the printing area, the differences in the distance between the photoelectric cell and the individual portions of the copying surface or printing layer were not taken into account in the determination of the exposure time. In other words, when the copying surface was uniformly illuminated those areas of the printing layer that were situated closer to the photoelectric cell contributed a greater amount of light to the photoelectric cell than did those areas of the printing layer which were situated at a greater distance. This resulted in errors in the determination of the exposure time, especially when photographic negatives having substantial variations in density were being enlarged.

Furthermore, in devices of this type, at least parts of the mechanical and electrical elements of the regulating device are separately arranged without forming a structural unit with the enlarger frame. This arrangement takes a relatively great amount of space alongside of the enlarger frame.

In contrast to the previously known devices of this type, the present invention concerns an apparatus which is so constructed that the photoelectric cell is controlled by light rays from the whole of the printing area although the distance between the cell and the printing area is very small. This is obtained by arranging a diffuse type reflecting means incorporating dull-surfaced light-diffusing means in the path of light between the copying surface and the photoelectric cell in such manner that light rays received from the copying surface are caused to first strike the diffuse reflecting means.

It is further an object of the present invention to apply said reflecting means for making the automatically regulated exposure time independent of differences in the distance between the photoelectric cell and the various portions of the copying surface. For that reason the reflecting means is so constructed and arranged relative to the copying surface and to the photoelectric cell that it acts to reflect light rays coming from the remote portions of the copying surface directly into said photoelectric cell, whereas the light rays from the nearer portions of the copying surface impinge upon the reflector in such a manner that they are not reflected directly through the photoelectric cell opening but, on the contrary, are diffused by the reflector, within the reflector housing, so that the portion of the light which enters through the potoelectric cell opening is greatly diminished. The parts are so arranged that the amount of light entering into the photoelectric cell from the relatively nearer portions of the copying surface is substantially equal to the amount of light entering the cell from the more distant portions of the copying surface, when said copying surface is uniformly illuminated.

More particularly the photoelectric cell is provided with an aperture such that only light reflected from a fraction of the area of said reflecting means can impinge directly upon the cell, and wherein a light converging means is located in the path of rays between said copying surface and said reflecting means so that the light rays coming from a portion of the copying surface, are incident the more upon said fraction of the area of said reflecting means, the greater the distance between said portion of the copying surface and said photoelectric cell is.

The diffuse reflecting means, according to the present invention, is provided upon the inner surface of an upper wall of the reflector housing; the lower wall of the housing forming the upper wall of the photoelectric cell housing and having an aperture therein in line with the opening in the photoelectric cell. A light-focusing element, which is preferably in the form of a semi-cylindrical lens, may be inserted in the open front wall of the reflector housing in the path of the light rays entering from the copying surface. Furthermore, a filter may be provided on the lens, this filter being so constructed that its light permeability decreases directly in proportion to the decreased distance between the copying surface and the photoelectric cell.

The entire assembly including the photoelectric cell, the lens, and the copying surface, together with the enlarger frame, can be combined into a single structural unit. The enlarger frame, which is commonly provided with adjustable picture masking frames, can also be provided with means, such as a pair of potentiometers, for maintaining a predetermined sensitivity of the regulation apparatus in whatever positions of adjustment the masking frames are arranged. The masking frames, as well as the surface of the base plate, are black.

Other and distinct objects of the present invention will become more apparent from the description and claims which follow, and in which:

Fig. 1 is a fragmentary perspective view of a device embodying the present invention, Fig. 2 is a cross-sectional view of the device shown in Fig. 1, and Fig. 3 is a development of a filter adapted to be used in conjunction with the lens element.

Referring now in greater detail to the figures of the drawings wherein similar reference characters refer to similar parts, there is illustrated an optical copying device comprising a base plate 1 adapted to hold the copying papers. An elongated housing 5 is mounted on the base plate 1 and extends the length of one side of the plate. Hingedly connected to the front wall of the housing 5 is a masking frame 2 on which are slidably mounted a pair of perpendicularly arranged picture masks 3 and 4. These masks 3 and 4 are perpendicularly slidable relative to each other.

Within the housing 5 is provided a photoelectric cell of an automatic exposure control device. The housing 5 may further contain the various other electrical actuating components of this device, which are not shown. The photoelectric cell 6 may be combined with a secondary electronic multiplier.

A housing 7 is provided above the housing 5 and is separated therefrom by a partition 9. The housing 7 further comprises a curved wall 8 which forms the rear and top walls of the housing. The walls 8, 9 of the housing 7 reflect the light more or less diffusely from their inside surfaces by incorporating dull-surfaced light diffusing means. The front of the housing 7 is open. Mounted within the open front of the housing 7 is a cylindrical lens 10 for collecting light and focusing it selectively on reflecting surfaces 8 and 9. The housing 7, together with its wall surfaces and lens, is so constructed that light rays, reflected from any portion of the copying surface on the base plate 1, enter the housing 7 through the lens 10 and are diffusely reflected by the wall 8.

The photoelectric cell 6 is provided with an opening 12 in line with an aperture 13 in the partition 9. A view of Fig. 2 will show that the area of the wall 8 from which a light ray may be reflected into the opening 12 is limited by an outwardly diverging cone extending generally upwardly and rearwardly from the photoelectric cell through the aperture 13 and against the rear portion of the reflecting surface of the wall 8.

The lens 10 is so arranged relative to the housing 7 and the base 1 that the optical axis 11 of the lens extends through the approximate center of the copying surface.

Fig. 2 illustrates the functioning of the device. As seen in Fig. 2, a portion of the light rays impinging on the copying surface on the base plate 1 from a source of printing light, not shown, is reflected from the copying surface through the lens 10 and into the reflector housing 7. All the rays from the copying surface impinge against the inner reflecting surface of the wall 8. The rays 14, from the more distant areas, strike the reflecting surface at 15 in such a manner that they are reflected within the areas defined by the outwardly diverging optical cone leading from the opening 12 of the photoelectric cell. These rays 14, therefore, are directly reflected through the aperture 13 into the opening 12 of the cell. On the other hand, the rays 16, which are reflected from the nearer portion of the light reflected surface, impinge against the wall 8 at 17. These rays 16 are not directly reflected into the photoelectric cell since they are outside of the optical cone, but are, instead, diffused throughout the reflecting housing 7. Therefore, although a portion of this diffused light once or more times reflected from the walls 8, 9 comes within the area of the optical cone and is, therefore, reflected into the photoelectric cell, the total amount of such light is far less than the amount of light originally reflected from the nearer portion of the copying surface. The housing, the lens, and the copying surface, as well as the photoelectric cell, are so arranged that the amount of light reaching the photoelectric cell from any portion of the copying surface is substantially equal to the amount of light reaching the cell from any other portion of the surface when said copying surface is uniformly illuminated. As a result, the electrical current generated by the photoelectric cell is substantially in exact proportion to the amount of light that is actually reflected from the entire area of the copying surface.

In order to make the device even more effectively independent of the distance variations between the photoelectric cell and the various portions of the copying surface, a light filter 18 can be arranged in the path of light between the copying surface and the photoelectric cell, and being situated parallel to the cylindrical lens 10. This filter 18 is so constructed that its light permeability increases in proportion to the increasing distance between the portions of the filter 18 and the photoelectric cell. The development of such a filter, for instance to be fitted on the cylindrical lens 10, is illustrated in Fig. 3. Instead of using a filter, it is also possible to vary the reflecting capacity of the various portions of the reflecting surfaces of the walls 8, 9 to correspond with the varying distances between it and the portions of the copying surface.

In order to make the exposure time independent of the relative positions of the masking strips 3 and 4, each of these masking strips is provided at one end with a slider, such as shown at 19 and 20, and each of these sliders moves over a corresponding resistance element fixed to the frame 2 to provide a pair of potentiometers. These potentiometers are electrically connected to the regulating device for controlling its sensitivity.

The above-described elements may be all grouped together in a unitary structure with the enlarger frame. Furthermore, although only one photoelectric cell 6 has been illustrated, it is within the scope of the present invention to use a plurality of such photoelectric cells, each of such plurality of cells being arranged in axially spaced positions relative to one another within the housing 5.

It is also within the scope of the present invention to provide a device adapted to merely measure the exposure rather than to automatically regulate it. In such a device, the parts are so arranged that the light rays coming from the light source are reflected into the photoelectric cell, not from a printing paper, but from the surface of the base plate 1 itself, which, in such a case, may be used as a diffuse reflector.

As many apparently widely different embodiments of this invention may be made without departing from the spirit and scope hereof, it is to be understood, that the above invention is not to be limited, except as defined in the appended claims.

What is claimed is:

1. A photographic printing device comprising a base plate for holding a printing layer, automatic means for controlling the exposure of said printing layer, said automatic means including a photoelectric cell, a pair of reflecting walls whose inner surfaces are dull-surfaced light-diffusing reflecting means, said pair of reflecting walls extending laterally adjacent said base plate, one of said pair of reflecting walls includnig a concavely curved surface extending toward the other of said walls to substantially close one end of said pair and leave the other end of said pair open, said other of said walls including an aperture disposed opposite said concavely curved portion of the first-mentioned reflecting wall, said photoelectric cell being disposed outside of said walls in line with said aperture, and the open end of said pair of reflecting walls being arranged adjacent said base plate in a position to cause light rays coming from portions of said printing layer near said open end to pass through said aperture only after said rays have been reflected back and forth between said walls a number of times and to cause light rays coming from portions of said printing layer remote from said open end to pass relatively directly through said aperture after substantially direct impingement upon said concavely curved surface thereby causing the amount of light reaching said photoelectric cell from each portion of said printing layer to be substantially in equal proportions to the amount of light reflected from each of said portions.

2. A device as set forth in claim 1 wherein a light collecting and directing means is disposed in said open end of said pair of reflecting surfaces for collecting light from different portions of said printing plate and selectively directing said light between said pair of reflecting walls in the aforementioned manner.

3. A device as set forth in claim 1 wherein said pair of walls are disposed substantially parallel to each other and parallel to said printing layer, and said open end of said pair of walls being disposed adjacent one side of said printing layer.

4. A device as set forth in claim 3 wherein said pair of walls are arranged with said concavely curved surface remote from said printing layer and said reflecting wall including said aperture disposed adjacent said printing layer.

5. A device as set forth in claim 1 comprising a housing having two sections, one of said sections being formed by said pair of reflecting walls and accordingly having said open end through which said light rays pass, and said photoelectric cell being positioned in the other section of said housing with said wall including said aperture separating said sections from each other.

6. A device as set forth in claim 2 wherein said light collecting and directing means is a light converging means.

7. A device as set forth in claim 6 wherein said light converging means is comprised of a cylindrical lens.

8. A device as set forth in claim 2 wherein a light filter is disposed parallel to said light collecting and directing means and between said printing layer and said photoelectric cell, and the transparency of said light filter varies as a function of the distance between the portions of said printing layers and the portions of said filter through which light rays from respective portions of said printing layer pass to cooperate with said reflecting means in causing the amount of light reaching said photoelectric cell from any portion of the printing layer to be substantially proportional to the amount of light reflected from that portion.

9. A device as set forth in claim 8 wherein said light collecting and directing means is a cylindrical lens, and said filter is arranged upon a surface of said cylindrical lens.

10. A device as set forth in claim 1 including a supporitng housing disposed below said reflecting means; and all mechanical, optical and electrical components incorporated in said device other than those otherwise mentioned being disposed within said supporting housing to provide a single unitary device.

11. A device as set forth in claim 1 wherein a pair of adjustable masking strips are connected to said base plate in substantially perpendicular relationship to each other, variable electrical resistors are mounted upon and parallel to adjacent sides of said base plate, and a sliding electrical contact means coupling each of said strips with a separate one of said variable resistors for electrically connecting said varaible resistors to an automatic exposure regulating device for controlling its sensitivity in accordance with the positions of said masking strips relative to said base plate and to said photoelectric cell.

12. A photographic printing device comprising a base plate for holding a printing layer, automatic means for controlling the exposure of said printing layer, said automatic means including a photoelectric cell, a pair of reflecting walls whose inner surfaces are dull-surfaced light-diffusing reflecting means, said pair of reflecting walls extending laterally adjacent said base plate, a rear wall having an inner surface which is a dull-surfaced light-diffusing reflecting means extending from one to the other of said pair of walls to provide a casing having an open end and a closed end, one of said pair of walls including an aperture, said photoelectric cell being disposed outside of said walls in line with said aperture, said casing being arranged laterally adjacent said base plate in a position to cause light rays coming from said printing layer to pass through said open end into said casing, and said pair of laterally extending walls and said rear wall being arranged to cause said light rays coming from portions of said printing layer remote from said open end to pass relatively directly through said aperture after substantially direct impingement upon said walls and light rays coming from portions of said printing layer near said open end to pass through said aperture only after said rays have been reflected back and forth between said walls a number of times thereby causing the amount of light reaching said photoelectric cell from each portion of said printing layer to be substantially in equal proportions to the amount of light reflected from each of said portions.

References Cited in the file of this patent

UNITED STATES PATENTS

| | | |
|---|---|---|
| 2,330,877 | Fleisher | Oct. 5, 1943 |
| 2,436,104 | Fischer | Feb. 17, 1948 |
| 2,668,474 | Rogers | Feb. 9, 1954 |